May 6, 1941.　　　　A. J. MUMMERT　　　　2,240,907
PISTON EXPANDER
Filed Jan. 6, 1940　　　　2 Sheets-Sheet 1
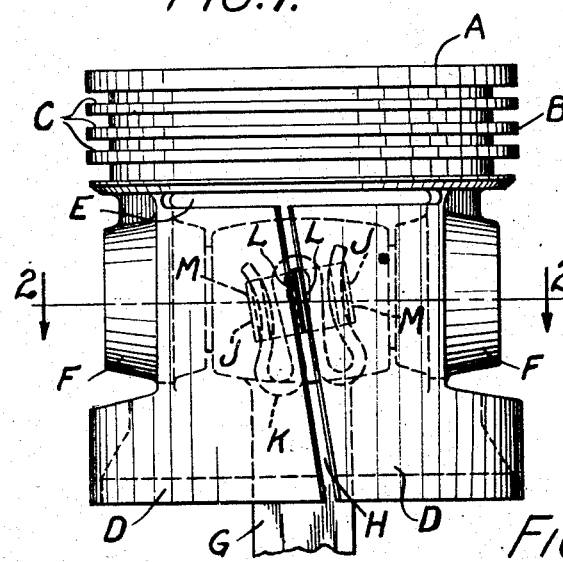
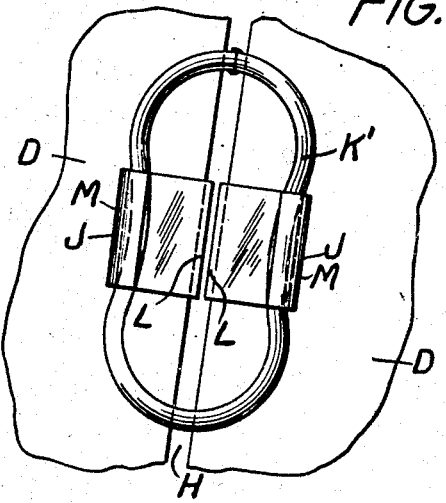
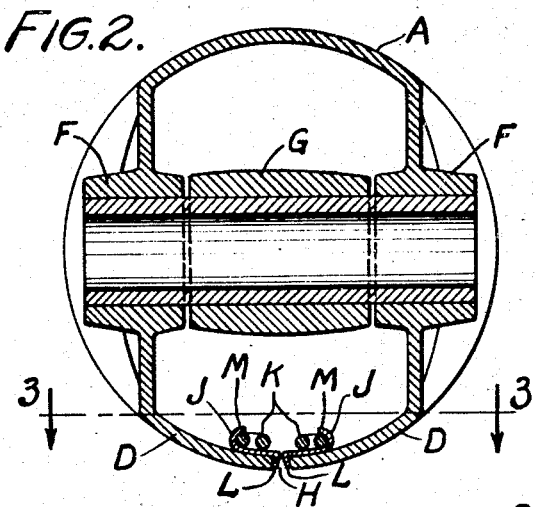
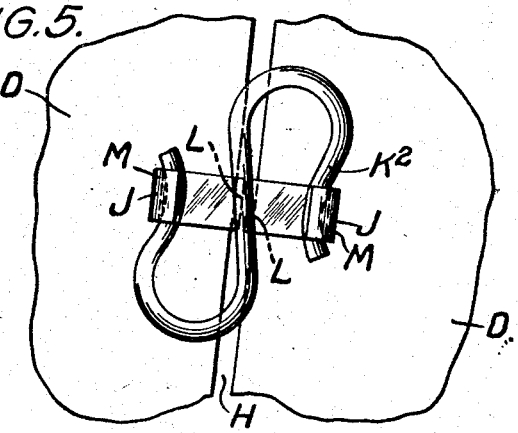
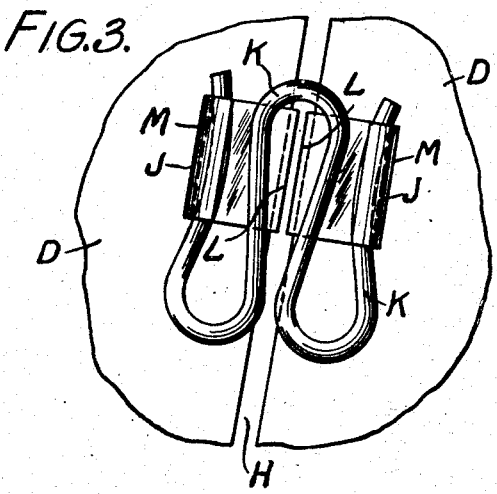
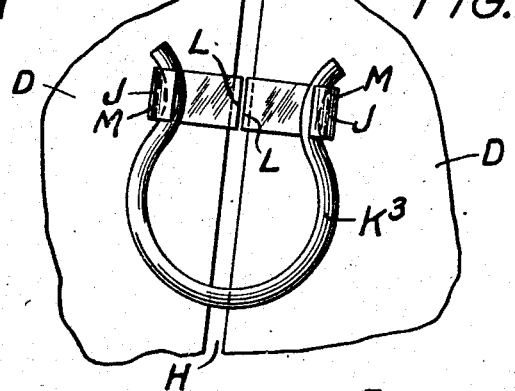
INVENTOR:
ARDEN JOHN MUMMERT
BY
ATTORNEY May 6, 1941.  A. J. MUMMERT  2,240,907

PISTON EXPANDER

Filed Jan. 6, 1940  2 Sheets-Sheet 2

INVENTOR;
ARDEN JOHN MUMMERT
BY J Henry Kinealy
ATTORNEY

Patented May 6, 1941

2,240,907

UNITED STATES PATENT OFFICE 2,240,907

PISTON EXPANDER

Arden John Mummert, University City, Mo., assignor to McQuay-Norris Manufacturing Company, St. Louis, Mo., a corporation of Delaware Application January 6, 1940, Serial No. 312,770

3 Claims. (Cl. 309—12)

My invention relates to piston expanders and more particularly to expanders arranged to increase the effective diameter of the skirts of pistons for internal combustion engines or other similar devices to compensate for wear in use and to provide for an effective fit between a piston and the wall of the cylinder in which it reciprocates.

Heretofore, many expanders of various types have been provided to engage the skirt at points and adjacent an axially extending slot therein and to force the portions of the skirt at this slot away from one another so that the circumference of the skirt will be increased. My present invention is directed towards providing an expander of this general type which will be simple in design and efficacious in operation and will include certain points of superiority not before found.

My invention in its broadest application includes a provision of a pair of parts anchored by any suitable expedient to the marginal portions of the piston skirt at each side of the axial slot therein and a spring of any suitable design formed separately from the anchored parts and arranged to move the parts to open up the slot and thereby increase the size or diameter of the skirt.

Figure 7:
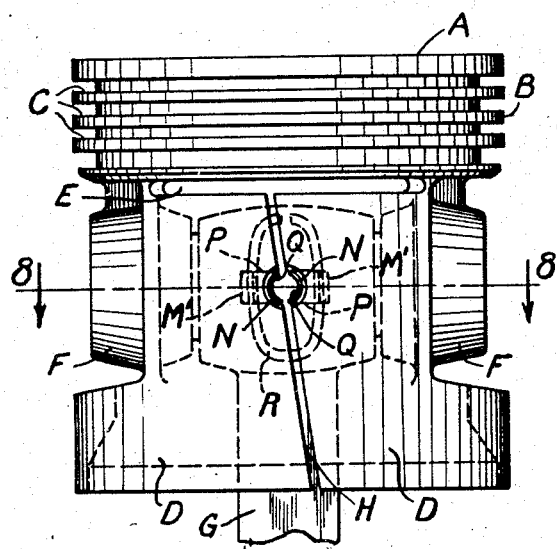
Figure 10:
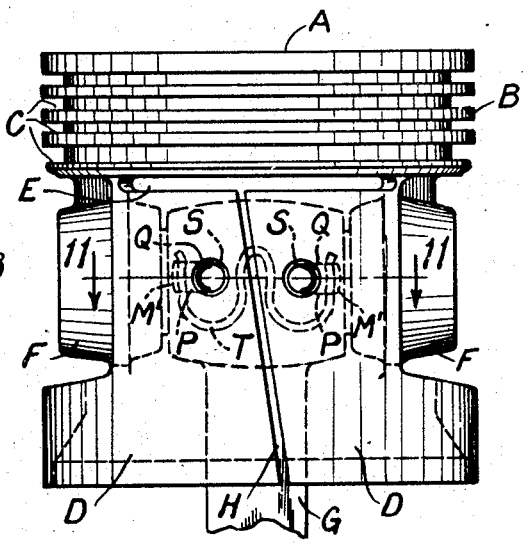
Figure 8:
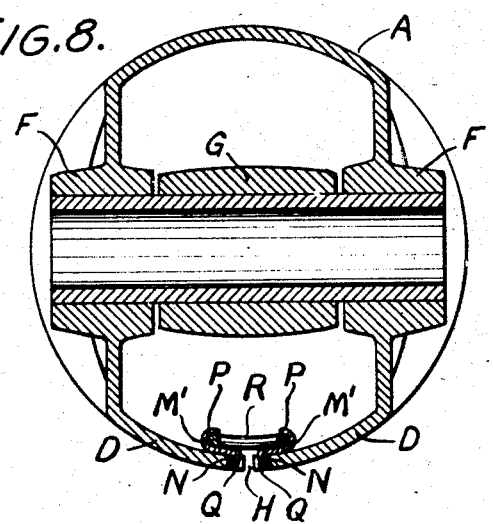
Figure 11:
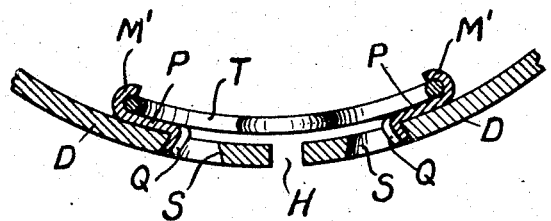
Figure 9:
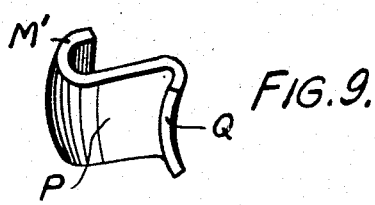

Several embodiments of various forms which my invention may take are shown in the accompanying drawings wherein similar characters are used to designate similar parts. In these drawings Fig. 1 is a view of a piston showing one embodiment of my invention mounted thereon; Fig. 2 is a cross section along the lines 2—2 in Fig. 1; Fig. 3 is a detailed view of the device taken along the lines 3—3 in Fig. 2; Figs. 4, 5 and 6 are enlarged views of modified forms of the invention as shown in Fig. 1; Fig. 7 shows a further modification of my device as mounted on a piston; Fig. 8 is a cross section of the assembly as shown in Fig. 7, along the lines 8—8 therein; Fig. 9 is a detailed view of one of the anchoring parts, as will be explained below; Fig. 10 shows still another modification of my expander as assembled in a piston; and Fig. 11 is a partial section of the assembly of Fig. 10 as taken along the lines 11—11 therein.

Referring to the figures and particularly to Figs. 1 to 3, inclusive, the piston A includes a head B having the usual piston ring grooves C and a skirt D depending from the head and separated therefrom throughout a major portion of its periphery by circumferentially extending slots E. The piston also has bosses F to receive a piston pin upon which the connecting rod G is mounted.

The skirt D is cut to form an axially extending slot H which in this embodiment is formed so that the edges of the adjacent marginal portions of the skirt at each side of the slot are not formed in a radial plane but, are arranged to diverge outwardly as shown in Fig. 2 and for the purpose more fully hereinafter disclosed. This embodiment of piston expander including my invention comprises a pair of parts J and a spring K formed of spring wire. Each of the parts J is formed of a single piece of flat metal and has a flange L formed at one end thereof and a hook M formed at the opposite end thereof. The flange L is bent back so that when a part J is mounted in place this flange will follow an edge of the skirt adjacent the slot H and will have firm engagement therewith. The spring K, in this embodiment, is in a double S shape and each free end thereof engages a hook M formed on a part J.

The assembling of this expander on an axially slotted piston is accomplished quickly and easily. The parts J are arranged with the flanges L extending into the slot, as shown in Fig. 2. The free ends of the spring K are brought together by any suitable expedient and are engaged in the hooks M on the parts J. The spring is then released and the expansive force created thereby will be exerted through the parts J to open up the slot H and, thereby, to increase the effective diameter of the piston skirt. In this way the expander will be securely anchored to the marginal portions of the piston skirt at each side of the slot and will be held in place firmly.

I do not propose, of course, to limit myself to any exact form of springs to be used with this embodiment and, therefore, in Figs. 4, 5 and 6, I have shown a few of the forms which such springs may take. In Fig. 4, I have shown a continuous oval shaped spring $K'$; in Fig. 5, I have shown an S-shaped spring $K^2$; and in Fig. 6, I have shown a U-shaped spring $K^3$. It will be evident that either form of spring may be used in engagement with the parts J. Similarly, although the types of spring shown have a free engagement with the hooks M on the parts J these or other types of springs may be soldered or welded to the parts J to maintain engagement therewith.

In order to secure permanent engagement between the anchoring parts of the expander and the marginal portions of the skirt a countersunk hole N may be drilled in the skirt at the slot, as shown in Figs. 7 and 8. The anchoring parts P each have an arcuate shaped flange Q formed at an angle to engage the edges of the hole N and each anchoring part includes also a hook M' to engage a spring R. One of the anchoring parts of this type is shown in detail in Fig. 9.

Similarly, I have found that sometimes it is desirable to anchor an expander of this type in the marginal portions of the skirt adjacent the slot, but not in the slot. This result may be accomplished by drilling a pair of holes S in the skirt at points removed the desired distance from the slot H and engaging the parts P therein, as shown in Figs. 10 and 11. An expander T may be mounted in the hooks M' and the proper expansive force on the piston skirt will be exerted.

It will be understood that to obtain varying degrees of expansion different springs may be included in an expander made according to my invention. Also, the resultant expansive force may be varied by the length of the parts J and, in case of the embodiment shown in Figs. 10 and 11, by the positioning of the holes S. These and other factors of my invention may be varied within wide limits and the size, shape and arrangement of the parts may be changed within a wide range without deviating from the spirit of my invention as included in the appended claims.

What I claim as new and desire to secure by Letters Patent, is:

1. An expander for a piston skirt having an axially extending slot therein, said expander comprising a pair of parts anchored to the marginal portions of said skirt at each side of said slot and a spring engaging said parts to move said marginal portions to open up said slot.

2. An expander for a piston skirt having an axially extending slot therein, said expander comprising a pair of parts freely engaging the marginal portions of said skirt at each side of said slot and a spring arranged to move said parts to expand said skirt and increase the effective diameter thereof.

3. An expander for a piston skirt having an axially extending slot therein, said expander comprising a pair of parts anchored to the marginal portions of said skirt at each side of said slot, each of said parts comprising a single piece of metal having a flange to engage said skirt and a hook at the end thereof opposite said flange, and a spring engaged by the hooks of said parts and arranged to move said parts to open up said slot.

ARDEN JOHN MUMMERT.